June 17, 1958   H. A. LOCKWOOD   2,838,795
METHOD AND APPARATUS FOR FORMING A DESICCATOR CAPSULE
Filed Jan. 12, 1953   2 Sheets-Sheet 1

INVENTOR
HARRY A. LOCKWOOD

BY
*Semmes, Kergin, Robinson & Semmes*
ATTORNEYS

INVENTOR
HARRY A. LOCKWOOD

United States Patent Office 2,838,795
Patented June 17, 1958

2,838,795

METHOD AND APPARATUS FOR FORMING A DESICCATOR CAPSULE

Harry A. Lockwood, Weston, Conn.

Application January 12, 1953, Serial No. 330,879

7 Claims. (Cl. 18—19)

This invention consists in new and useful improvements in a desiccator and the method and apparatus for forming the same. Its principal object is to provide a small, one piece desiccator, primarily adapted for use in the pharmaceutical industry, for insertion in bottles and other containers of products, wherein dehydration is essential to preserve the desired qualities thereof.

My improved desiccator was designed to replace the desiccator bags, heretofore used for this purpose, which are not only inconvenient to stuff into a bottle, but generally waste up to 50 or 75 percent of the absorptive capacity of the desiccant, before actual insertion in a container.

More specifically, it is an object of the invention to provide an imperforate tubular container or capsule formed of a suitable thermo-plastic material, having the desired moisture permeability to permit transmission of moisture from the bottle or container to a body of granular particles of desiccant material contained in the capsule, yet being dust free and sufficiently impervious to normal atmospheric moisture to prevent rapid or premature saturation of the desiccant.

Another object of the invention is to provide a desiccator of the type referred to, composed of a thermoplastic material which, when formed into a capsule and filled with granular particles of a desiccant, is sufficiently rigid to maintain its tubular shape and uniform contour, thus facilitating handling. In the use of tubes or capsules of this character, the volume of desiccant for a given length of tubing should be accurately pre-determined, thus aiding in uniform and positive closure and maintenance of the shape of capsule.

A further object of the invention is to provide a desiccator capsule of this nature, wherein the tubular container is formed of transparent thermo-plastic material and charged with a "tell tale" desiccant, thus enabling easy discernment of the condition of the desiccant.

Still another object of the invention resides in the provision of a novel method and apparatus for producing a desiccator capsule of the type referred to, including a spinning operation which provides the complete closure of the ends of the tube, while maintaining the uniform shape and volume thereof. An advantage of this tube closure method lies in the resulting provision of a small, twisted peak or nipple on each end of the closed capsule which, when used as a desiccator in bottles or containers of medicinal capsules or the like, readily distinguishes the desiccator capsule from the medicinal content of the bottle, both by appearance and touch, so as to prevent the consumer from inadvertently swallowing the wrong capsule.

Still another object of the invention is to provide a method and apparatus including a series of successive steps and stations, designed for operation on a tube of thermo-plastic material, to first apply a predetermined indicia to the outer surface of the tube, then close one end of the tube, charge the tube with a desiccant, close the other end of the tube and finally release the completed capsule.

A still further object of the invention is to provide in a process such as described, a tube closing die, adapted to spin the ends of the tube into closures in an operation of varying speeds, and designed to first gradually converge the edges of the open ends of the tube and then, at a given point, to automatically increase the speed of operation to produce a final closure resulting in the projecting peaks or nipples above referred to.

With the above and other objects in view which will appear as the description proceeds, the invention consists in the novel features hereinafter set forth, illustrated in the accompanying drawings and more particularly pointed out in the appended claims.

Referring to the drawings in which numerals of like character designate similar parts throughout the several views—

Figure 1:
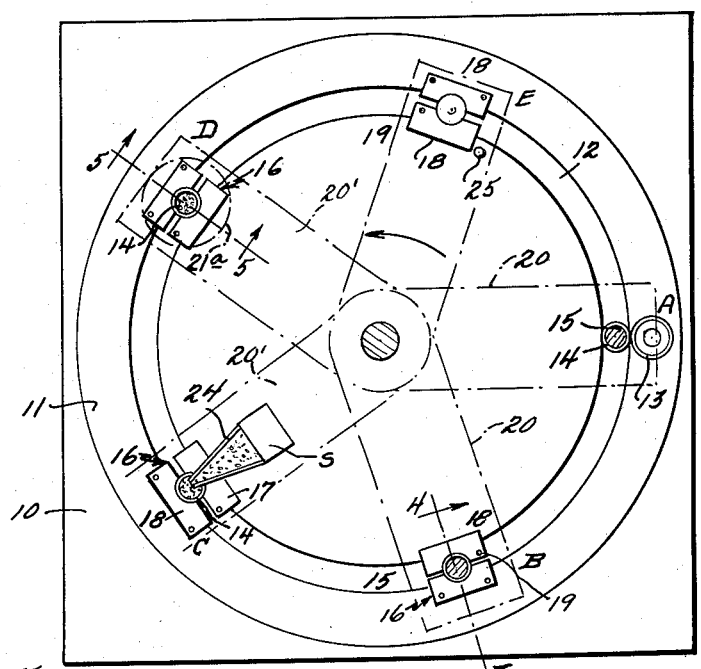
Figure 1 is a diagrammatic plan view illustrating one embodiment of the invention and showing the sequence of stations and operations involved.

In the drawings, referring first to Figure 1, I have diagrammatically illustrated a plan view of one embodiment of an apparatus for practicing the invention, showing the successive stations of operation upon a tube of thermo-plastic material. Here the number 10 represents a main support of any suitable form, and on which is mounted in spaced relation, a stationary horizontal table 11, preferably of circular shape. The table 11 supports the various mechanisms designed for successively acting upon the tube, an annular slot for open track 12 being provided inwardly of the table's periphery to permit the passage of the tube from station to station, as will hereinafter be described.

Station A comprises a printing or marking device which may be of any conventional form such as an inking device, diagrammatically indicated, arranged adjacent to slot 12 and adapted to imprint suitable indicia upon the outer face of the tube as the latter is moved past the inking device.

Station B includes a mechanism for spinning the lower end of the tube into a closure. Station C consists of a suitable storage and charging device, operable after the bottom of the tube is closed, to fill the tube with a predetermined quantity of desiccant. Station D consists of a spinning mechanism generally similar to that in station B, for closing the top end of the filled tube, and station E comprises a tripping mechanism for releasing the completed capsule.

Aside from the spinning apparatus for closing the tube ends and means for automatically controlling the spinning operation, the individual mechanisms for accomplishing the functions above enumerated, may be of any conventional design and per se, form no part of the present invention. They are shown for the purpose of facilitating a clear understanding of the complete sequence of operations which collectively, comprise the invention.

At this point, it should be explained that the tube upon which these operations are performed, consists of tubing of transparent thermo-plastic material, preferably cellulose acetate, although other materials such as cellulose acetate butyrate, ethyl cellulose, methyl celluose, or similar substances having the desired characteristics may be employed. The thickness of the tube must be such as to provide sufficient rigidity for self support and must be thin enough to provide sufficient permeability for the product to be of value as a desiccator.

Returning to Figure 1 of the drawings, a short length of tube 14, open at both ends, is first placed upon a vertically disposed cylindrical mandril 15, of a diameter to closely embrace the inner walls of the tube, said mandril being supported by any suitable means 20 for circular travel in a fixed horizontal plane, within the slot 12. Upon movement past station A the desired indicia is applied to the outer surface of the tube and it proceeds to station B with the mandril 15.

Upon reaching the station B the tube with the mandril in place, is secured in a clamping device generally represented by the numeral 16, and preferably comprising one fixed jaw member 17 and a second jaw member 18, pivoted at 19 for swinging movement into and out of engagement with the tube.

Figure 4:
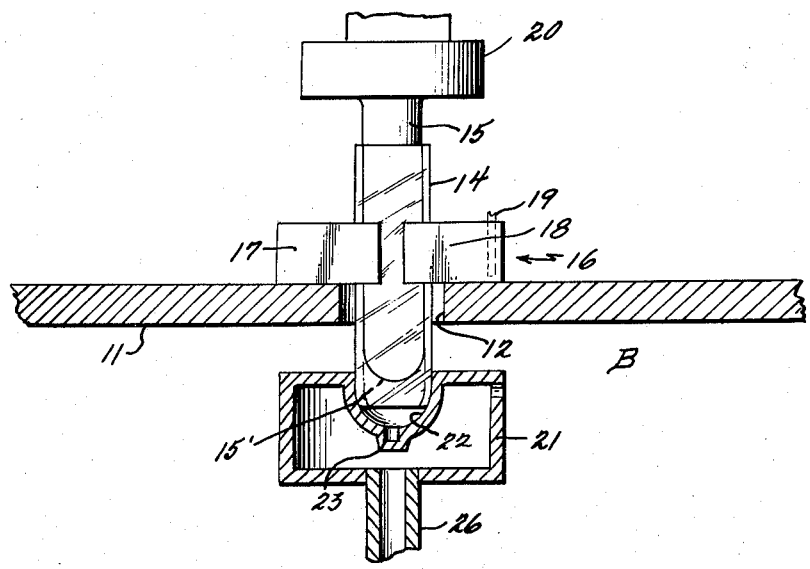
Figure 4 is an enlarged sectional view taken on line 4—4 of Figure 1, illustrating the bottom closing die.

Turning now to Figure 4 of the drawings, the mechanism of station B, for closing the lower end of the tube, is illustrated on an enlarged scale. The mandril 15 is rounded at its lower end 15' and extends into the tube 14 to a point spaced inwardly from the lower end thereof, a sufficient distance to permit closing of the tube thereover, as hereinafter described.

The clamp 16 engages the tube substantially midway of its length, adjacent the upper surface of the table 11 as shown.

A rotatable, vertically reciprocable bottom closing die head 21, is positioned beneath the table 11 and is provided in its top face with a concave shaping recess 22, the bottom of which is formed with a centrally located, transversely restricted depression 23, into which the extreme end of the tube is spun, thereby effecting closure, as the rotating head 21 is progressively elevated. The mechanism for operating the die head and for controlling its elevation will be hereinafter described.

Upon completion of the closure of the bottom of the tube 14 at station B, the mandril 15 is elevated and withdrawn from the tube, and the clamp 16, with the tube still in place therein, travels along the slot 12 to a station C where a supply of desiccant S is mounted. This is diagrammatically illustrated in Figure 1, which likewise illustrates a charging device 24 of any convenient design, for introducing measured quantities of desiccant such as silica gel, into the upper ends of successive tubes 14.

From station C the charged tube 14 and retaining clamp 16 continue their travel in slot 12 until station D is reached, where a spinning apparatus generally similar to that described in connection with station B, is located. However, as shown in detail in Figure 5, the position of the rotary die head 21a in this instance is reversed, it being disposed above the table 11 so that upon descent it engages the top edge of the tube. The die head 21a is similarly provided on its upper face with a concave shaping recess 22a, the walls of which merge in a concentric tip forming bottom depression 23a, of restricted diameter.

Figure 6:
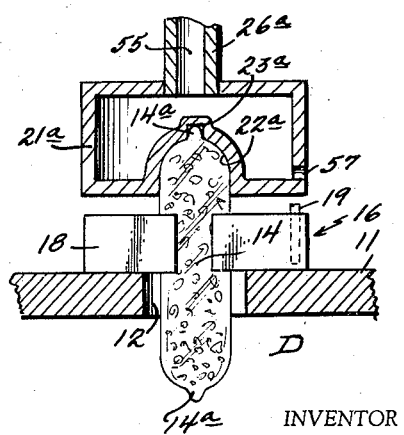
Figure 6 is a view similar to Figure 5 but showing the die in its final closing stage.

In this operation, the upper edge of the tube 14 is spun into the recess 22a as the die head descends and its extreme end is finally closed in a peak-like projection by being spun into the concentric depression 23a, as shown in Figure 6, and hereinafter described more in detail.

Finally, the clamp 16 and now completely closed and charged tube 14, travel to station E, where a tripping device of any design, illustrated diagrammatically at 25, operates to release the clamp 16. The hinged member 18 of the clamp swings open on its pivot 19 and the completed capsule is dropped through the slot 12, into a collecting receptacle (not shown).

Any convenient mechanism 20' may be employed for causing the clamp 16 and contained tube to travel around the slot 12 from station to station.

As before indicated, the operating mechanisms of the spinning die heads 21 and 21a are substantially the same and it will be sufficient for purposes of understanding the invention, to describe only one of such mechanisms, for example, the top closure structure.

Figure 2:
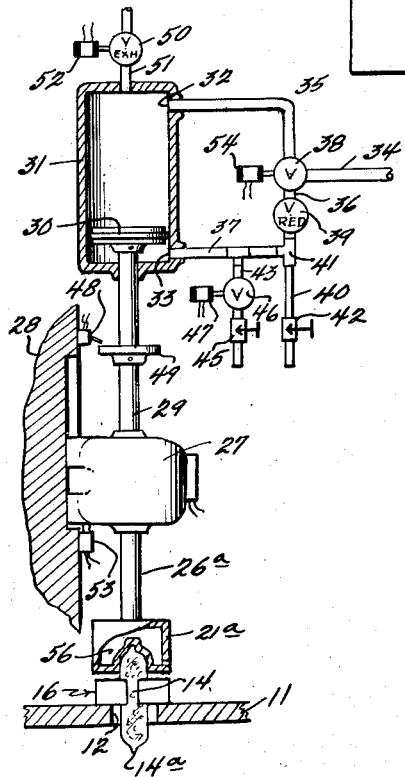
Figure 2 is a view in side elevation, partly in section, illustrating one form of mechanism for controlling the operation of the spinning dies.

One embodiment of an assembly for performing this operation is more or less diagrammatically illustrated in Figure 2. Here, the die head 21a is fixed on the lower end of a rotary shaft 26 which forms a downward extension of the shaft of a vertical electric motor 27. The motor is laterally supported for vertical sliding movement by a suitable bracket and guide way 28 and is suspended from the lower end of a piston rod 29. A piston or plunger 30 is fixed to the upper end of the rod 29 and is mounted in a cylinder 31, for reciprocation between upper and lower fluid pressure openings 32 and 33, respectively.

A main pressure supply line 34 leads from a source of fluid pressure such as compressed air (not shown) and is connected into two branch supply lines leading to connections 32 and 33 in the cylinder 31. Branch line 35 leads from the main line 34 to opening 32 above the piston 30 while branch lines 36—37 lead to opening 33 below the piston, a conventional main control valve 38 of the three-way type being interposed in supply line 34 at the junction of the two branch lines 35 and 36.

In order to more uniformly control the descent of the die head 21a, it has been found that more satisfactory results can be obtained by providing differential pressures in the cylinder, above and below the piston 30. Thus, the branch line 36 is provided with a pressure reducing valve 39, so that during the operation of the device a greater pressure is applied to the top surface of the piston 30 than to the bottom surface thereof. A pressure bleed line 40 is connected to branch line 36 by means of a T-connection 41 and said bleed line is provided with a pressure release valve 42, adapted to be adjusted for controlling the rate of the escape of pressure through the bleed line as the piston 30 descends under the greater pressure introduced into the upper portion of the cylinder through branch connection 35. Thus, the mechanism can be regulated to provide a uniform descent of the piston 30 and die head 21a, controlled by the pressure differential on the two sides of the piston and the adjustment of the release valve 42.

Figure 5:
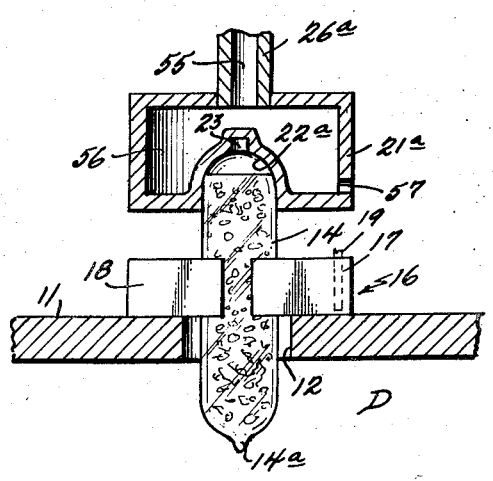
Figure 5 is a similar view taken on line 5—5 of Figure 1, illustrating the top closing die.

The uniform descent above described accomplishes the initial stage of closing the upper edge of the tube 14, sufficient heat being generated by the friction of rotation and descent of the head 21a, to cause the tube to be spun into a gradually closed condition as shown in Figure 5. Then, it has been found that in order to properly close the very tip of the tube and provide the projecting peak before referred to, the speed of descent of the head 21a should be suddenly increased to rapidly spin the extremity of the tube into the depression 23a. This final position of the head 21a is illustrated in Figure 6, where it will be seen that the tip 14a on the end of the tube 14 has been spun and twisted into the depression 23a.

In order to accomplish this increased speed of descent, it will be seen from Figure 2, that the branch line 37, leading to the reduced pressure side of the cylinder 31, is provided with a supplemental bleed line 43, connected by a T 44. The bleed line 43 is also provided with an adjustable release valve 45 which can be regulated to control the rate of discharge, and anterior to this release valve 45, there is provided a control valve 46 which normally closes the secondary bleed line 43 so that during the initial stage of descent the pressure release from the cylinder is controlled entirely by the release valve 42 in line 40. The control valve 46 is operatively connected to a solenoid 47 which is electrically connected to a switch member 48, preferably located on the motor supporting bracket 28 in the path of movement of a radially extending flange 49, fixed to the piston rod 29. Thus, when the piston and piston rod have reached a pre-determined point in their descent, the flange 49 trips the switch 48, energizing the solenoid 47, to immediately open the valve 46 which increases the rate of pressure escape from the lower end of the cylinder 31. This causes a rapid increase in the rate of descent of the die head 21a, resulting in the completion of the closure of the end of the tube 14, as previously described.

At the conclusion of this final closure step, it is desirable to immediately release the pressure from the upper end of the cylinder 31 and this is accomplished by a pressure relief valve 50, connected into the top of the cylinder 31 by a line 51. The relief valve 50 is likewise controlled by a solenoid 52, electrically connected to a switch mechanism 53, located on the lower portion of the motor supporting bracket 28 in line for engagement by an abutment on the motor 27, when the latter reaches its final descended position. Operation of the switch 53 energizes the solenoid 52 and immediately opens valve 50 to completely release all pressure from the upper end of the cylinder 31.

A third solenoid 54 is operatively connected to the main three-way valve 38 and is also under the control of the switch 53, the arrangement being such that upon tripping the switch 53 and opening of the relief valve 50, the solenoid 54 is simultaneously energized to shift the valve 38 so that the supply of pressure to branch line 35 leading to the upper end of the cylinder is cut off and the pressure concentrated on the under side of the piston 31 to elevate the latter and consequently raise the die head 21a from contact with the closed tube 14.

During this closure operation the motor 27 is designed to rotate the die head 21a at approximately 18,000 revolutions per minute, and in order to prevent the building up of excessive heat in the die head which would have an increasing deleterious effect upon successive tubes, it is desirable to provide some means for cooling the die head. Any means can be provided for this purpose and one such means is illustrated in Figure 5, where 55 represents a central passage-way in the piston rod 26a, through which cool air is introduced into the hollow interior 56 of the die head and from which it is discharged through an outlet opening 57.

The specific mechanism just described for actuating the die heads is solely for illustrative purposes and it will be understood that the invention is in no way limited thereto. Obviously, other apparatus either electrical or mechanical could be designed for accomplishing the desired function.

Figure 3:
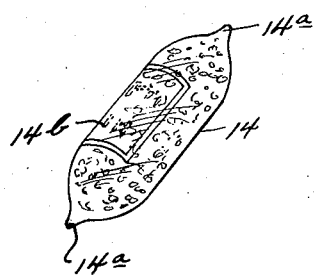
Figure 3 is an enlarged perspective view of a completed capsule formed in accordance with the present invention.

The completed capsule is illustrated in Figure 3, where it will be seen that both ends are provided with projecting peaks 14a and suitable indicia is applied to the outer surface of the tube which may be in the form of printed matter identifying the device as a desiccator and warning against eating the same.

Of course, these capsules can also be used as desiccator capsules to control the moisture present in confined spaces within precision instruments, electronic and optical equipment etc. They may also be used in connection with dehydrated packaging.

As before indicated, the desiccant used in charging the tube 14 is preferably silica gel which may be impregnated with a cobalt salt to render it capable of visibly indicating the condition of the gel in regard to its remaining moisture absorbent properties. The gel is readily discernible because of the transparent nature of the thermo-plastic material used in the manufacture of the tube 14, so that at a glance one can determine whether or not the capsule is still effective.

It will thus be seen that with this improved process and method, the production of a highly efficient desiccator capsule is made possible. It is completely dust proof and due to the characteristics of the thermo-plastic material forming the tube, it retains its uniform shape but is sufficiently moisture permeable to permit the required moisture transfer. The tube is completely closed at both ends and the two projecting peaks 14a make it possible to readily distinguish between the capsule and the medicinal preparation contained in the pharmaceutical bottle in which the capsule is inserted.

In summary, it should be noted that some of the salient features of the device of this instrument are that the capsule is sufficiently rigid to retain its shape, is transparent, is dust proof, and that the casing is made of one-piece construction.

From the foregoing it is believed that the invention may be readily understood by those skilled in the art, without further description, it being borne in mind that numerous changes may be made in the details of construction and operation, without departing from the spirit of the invention as set forth, in the following claims.

I claim:

1. The method of forming desiccator capsules including steps, comprising spinning one marginal end of a tube of thermoplastic material against a concave wall to form a first closed end, filling the tube with a desiccant, and spinning the remaining marginal end of the filled tube against a concave wall to form a second closed end, wherein said spinning steps each include a first phase, comprising slowly spinning the end of the tube closed, followed by a second phase, comprising rapidly spinning said end against a supplemental, restrictive hollowed wall to form a complete closure.

2. Mechanism for closing an end of a tube of thermoplastic material, comprising a tube supporting element, a die element mounted adjacent said supporting element, said die element having a primary, concave shaping recess aligned to receive the end margin of a tube held by said supporting element, means for rotating one of said elements with respect to the other, means for axially advancing one of said elements toward the other, to cause engagement of said primary recess with the end margin of said tube, said die element having a concentric, secondary recess of restrictive diameter, arranged in the inner extremity of said primary recess, adapted to effect a final closure of said tube.

3. Mechanism as claimed in claim 2, wherein said tube supporting element is stationary and said die element is rotatable and movable axially with respect to the supporting element.

4. Apparatus for forming a desiccator capsule, comprising a supporting platform, a clamp on said platform for holding a length of tube in a vertical position, a first die element, means for rotating the latter connected with said platform, means associated with said immediately preceding means for axially advancing said die element into engagement with one end margin of a tube held in said clamp, to spin the end of the tube closed, a desiccant charging station adjacent said platform, means for moving said clamp and tube into a charge-receiving position, a second die element, means connected with said platform for rotating said second die element, and means for axially advancing the latter into engagement with the opposite end margin of said tube to close the same over the charge of desiccant.

5. Apparatus as claimed in claim 4, wherein each of said die elements has a concave shaping recess for effecting a first closure phase, the inner extremity of said recess terminating in a concentric, transversely restrictive depression, for effecting a final closure phase, and adapted to receive and spin the extreme ends of said tube into a closed peak.

6. Apparatus as claimed in claim 5, including mechanism for controlling the initial advance of said die elements, at a selected speed, during said first phase, and means for automatically increasing the speed of advance, during said second phase.

7. Apparatus as claimed in claim 6, wherein said die advancing means is actuated by means responsive to fluid pressure.

References Cited in the file of this patent

UNITED STATES PATENTS

| | | |
|---|---|---|
| 2,169,315 | Yngve | Aug. 15, 1939 |
| 2,210,862 | Troustad | Aug. 6, 1940 |
| 2,277,050 | Reed | Mar. 24, 1942 |
| 2,399,592 | Bradshaw | Apr. 30, 1946 |
| 2,431,537 | Bogoslowsky | Nov. 25, 1947 |
| 2,465,163 | Lockwood | Mar. 22, 1949 |
| 2,503,171 | Posner | Apr. 4, 1950 |
| 2,521,985 | Lange et al. | Sept. 12, 1950 |
| 2,530,400 | Rado | Nov. 21, 1950 |
| 2,578,324 | Southwick | Dec. 11, 1951 |
| 2,591,490 | Allen | Apr. 1, 1952 |
| 2,614,650 | Chandler et al. | Oct. 21, 1952 |
| 2,638,179 | Yard | May 12, 1953 |
| 2,649,923 | Woppman | Aug. 25, 1953 |

OTHER REFERENCES

"The Condensed Chemical Dictionary," Fourth Edition, Reinhold Publishing Corporation, 1950, page 649.